D. J. JENNINGS.
DEVICE FOR MAKING PAPER RECEPTACLES.
APPLICATION FILED JUNE 11, 1917.
1,346,827. Patented July 20, 1920.
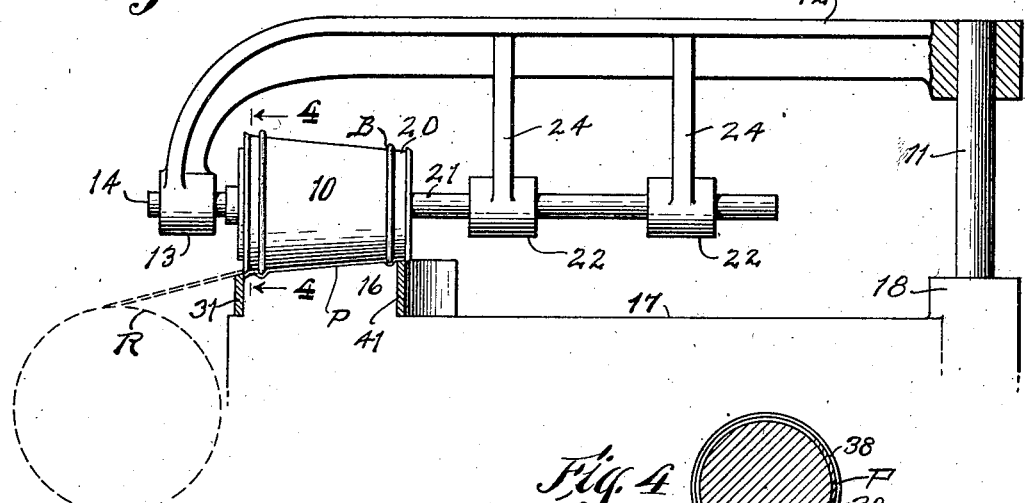
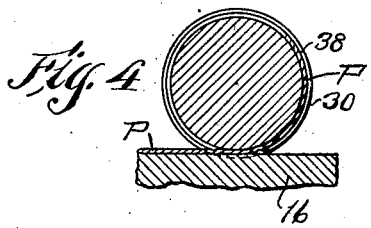
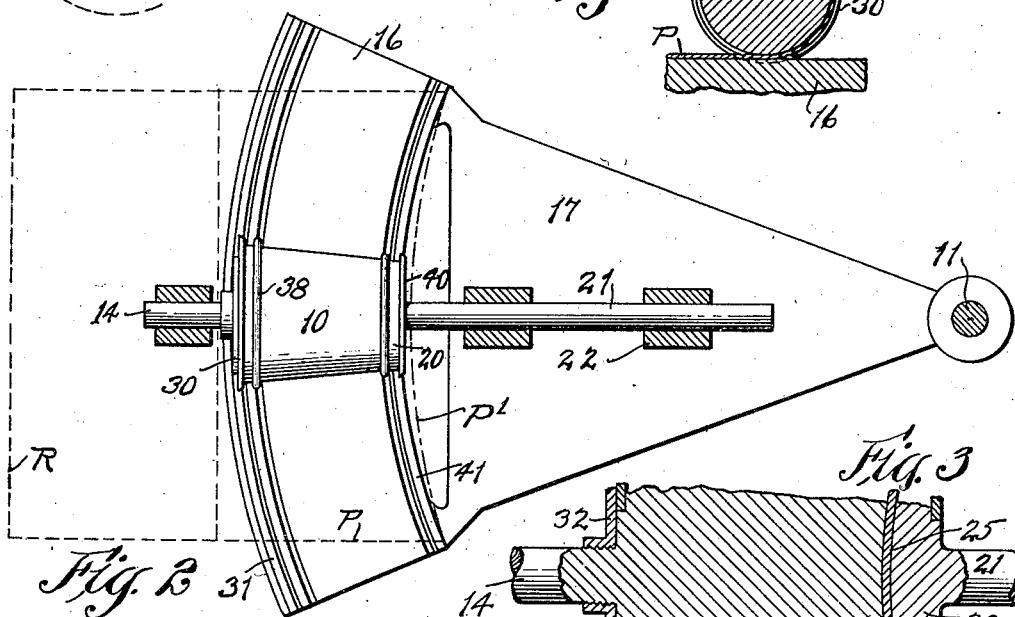
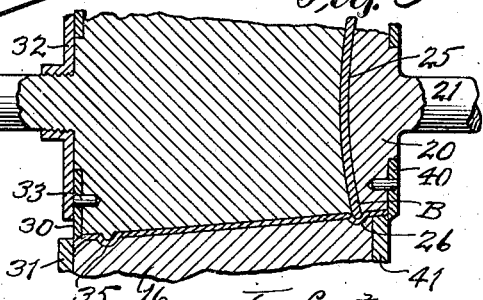
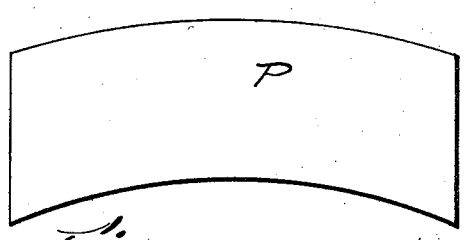

UNITED STATES PATENT OFFICE.

DAVID J. JENNINGS, OF CLEVELAND, OHIO.

DEVICE FOR MAKING PAPER RECEPTACLES.

1,346,827.   Specification of Letters Patent.   Patented July 20, 1920.

Application filed June 11, 1917. Serial No. 173,920.

*To all whom it may concern:*

Be it known that I, DAVID J. JENNINGS, a citizen of the United States, residing at Cleveland, in the county of Cuyahoga and State of Ohio, have invented a certain new and useful Improvement in Devices for Making Paper Receptacles, of which the following is a full, clear, and exact description, reference being had to the accompanying drawings.

This invention relates to devices for manufacturing paper receptacles employing a mandrel and a coacting platen. The general object of this invention is to provide a simple, effective mandrel and coacting platen which may form the receptacle with a minimum number of operations. A more specific object is to so construct the mandrel and platen that the side wall of the receptacle will be formed from a continuous sheet of paper which may be fed across the platen and which will accomplish the formation of the side walls of the receptacle with the least possible waste of material.

My invention is hereinafter more fully described in connection with the accompanying drawings, illustrating a convenient embodiment thereof. The essential characteristics are summarized in the claims.

In the drawings, Figure 1 is a side elevation of the mandrel and its carrier and the coacting platen; Fig. 2 is a plan of the same; Fig. 3 is a fragmentary axial sectional detail through the mandrel and portion of the coacting platen, shown on an enlarged scale; Fig. 4 is a section taken transversely to the mandrel and platen; Fig. 5 is a plan illustrating the blank forming the wall of the receptacle as cut by the mandrel during the process of formation.

Referring to my invention by the use of reference characters, 10 indicates a tapered mandrel whose frusto-conoidal surface is coincident with a theoretic cone whose apex is at the axis of the shaft 11. On this shaft is mounted an arm 12 extending outwardly over the mandrel and provided with a bearing at 13 rotatably embracing a short shaft member 14 on which the mandrel is rigidly mounted. The platen 16 is in the nature of an arcuate plate upon which the mandrel rolls and whose surface is complementary to the conical mandrel 10. The major portion of the platen lies in the surface of a theoretic cone whose apex is coincident with the apex of the theoretic cone of the mandrel 10. The platen is shown as connected by a suitable frame work indicated at 17 with a bearing 18 for the shaft 11, whereby the relative position of the mandrel and platen are maintained.

An extension of the mandrel 10 is provided at 20, which is shown as rigidly mounted on the shaft 21 having bearings 22 connected by bracket arms 24 with the arm 12. This extension is in the nature of a clamp which has its inward face convex as shown at 25 for the purpose of crowning the bottom member of the receptacle, the complementary surface of the mandrel being concave so that when the member 20 is brought against the bottom it is firmly secured.

The shaft 21 may be actuated by any suitable mechanism, not shown, such for example, as that shown, described and claimed in my application No. 184,999 filed August 8, 1917, whereby the bottom portion may be centrally positioned with relation to the mandrel and firmly clamped therebetween during the rolling of the receptacle side about the mandrel 10.

In operation the bottom member B is so centered with the mandrel that its periphery projects somewhat past the sides of the mandrel forming a uniform rib or flange, as shown in the drawing. The platen 16 is provided with an arcuate groove 26 about the center of the shaft 11 for coacting with the projecting periphery of the bottom disk 25 whereby when paper is rolled onto the mandrel from the side plate it is pressed into this groove 26 forming an outstanding bead the inside of which engages and positions the bottom closure in the receptacle.

The body of the receptacle is formed by paper from a roll R and positioned on the platen to provide the full sized blank required without wasting the paper. That is, the blank P which is cut from the roll is advanced until the forward edge stands as indicated in dot and dash lines at P', which edge is on a curve cut by a knife 30 carried by the mandrel. This knife 30 coöperates with an arcuate knife 31 rigid with the platen to sever the paper as the mandrel rolls along the inner edge of the knife 31. The knife 30 is shown as a disk ring secured to the head of the mandrel by a flange clamp 32 threaded onto the shaft 14 of the mandrel while the knife is positioned by dowel pins 33. The periphery of the knife is tapered outwardly and seats against the periphery of the wall or exterior of the mandrel whereby it may flare the paper outwardly when cut and formed, but may not cause any unnecessary offset shoulders scoring the paper.

The platen is beveled downwardly complementary to the periphery of the knife 30. Just inside this beveled portion in the platen is formed a groove 35 formed in an arc about the shaft 11 whereby it may coact with the rib 38 on the mandrel 10 which may permanently set the paper outwardly in the form of an outstanding bead adapted to receive an end closure or top for the receptacle. The formation of a bead 38, which may be adapted to collapse for facilitating ready removal of the receptacle from the mandrel, is shown, described and claimed in my application No. 186,835 filed May 14, 1917.

The head or clamp member 20 of the mandrel is also shown as carrying a knife 40 corresponding to the knife 30 but having its cutting edge beveled inwardly to coact with an arcuate knife 41 rigidly mounted on the opposite or inner side of the platen 16. The knives normally overlap somewhat so that they may trim off from the end portion of the sheet a narrow strip of paper extending transversely of the blank and terminating in points at each side thereof, this strip forming the difference between the curve or arc of the knives 30 and 40 respectively. The remaining portion of the paper may be rolled around the mandrel by causing it to adhere thereto as the mandrel advances across the platen. The means for causing such adherence may comprise a series of passages by which suction may be applied to the strip or may be in the nature of a clamp such as shown, described and claimed in my prior Patent No. 1,107,956, issued August 18, 1914.

After the mandrel is rolled across the platen to form a receptacle, during which formation I apply paste to the layer of paper thereon thus causing it to hold the form given it, the shaft 21 may be withdrawn by any suitable means to permit the removal of the receptacle.

It will be seen from the foregoing description that I have provided a mandrel and coacting platen which may automatically blank or cut out from a continuous strip the proper size and shape of paper to form the side walls or body of paper receptacles; that the cutting knives may so act on the strip as to prevent wasting of the paper; that by the use of this mandrel I may cause the bottom member of the receptacle to form its own bead, thus permanently positioning the same, while at the same time forming an internal groove extending around the top of the receptacle for positioning a top closure.

Having thus described my invention, what I claim is:

1. In a device for forming paper receptacles, the combination of a conoidal mandrel adapted to revolve about a center and rotate on its own axis and having cutting instrumentalities, the shearing edges thereof facing away from the center of revolution of said mandrel, with arcuate cutting instrumentalities at each side of the path of travel of said mandrel, the shearing edges of which face the said center of revolution of said mandrel and coacting with the cutting instrumentalities on the mandrel.

2. In a device for forming paper receptacles, the combination of a conoidal mandrel, means for revolving it about a center, a platen on which the mandrel is adapted to roll, said mandrel having a circular knife beveled outwardly toward the large end of the mandrel and meeting the mandrel surface in such manner as to form a portion of the exterior of the mandrel, an arcuate knife at the outer edge of the platen having its cutting edge at the inner side thereof to coact with the knife on the mandrel, said platen being beveled downwardly to conform to the contour of the knife on the mandrel adjacent the arcuate knife.

3. In a device for forming paper receptacles, the combination of a conoidal mandrel, an arcuate platen over which said mandrel rolls, means carrying said mandrel to revolve it about a center coincident with the theoretic apex of the mandrel cone, said means including bearings and a shaft connected with each end of the mandrel and carried in said bearings, the mandrel being divided into two parts, one forming a clamping member and adapted to be moved against the end of the other member to clamp a bottom disk in position to be rolled into the receptacle as the paper is wrapped about the mandrel.

4. In a device of the character described, the combination of a conoidal mandrel, an arcuate platen over which said mandrel is adapted to roll, said mandrel comprising two parts adapted to be brought together to clamp a disk between the same to form an end wall of the receptacle, circular knives on each part of the mandrel at each end thereof and coacting arcuate knives at each side of the platen.

5. In a device of the character described, the combination of a conoidal mandrel, an arcuate platen over which said mandrel is adapted to roll, said mandrel comprising a comparatively long body portion, a comparatively short end portion at the smaller end of the mandrel, said portions being adapted to clamp a disk between them, the surfaces between the meeting portions being shaped to crown said disk, a circular knife carried by said end portion of the mandrel and having its sharpened edge toward the mandrel and a coacting arcuate knife forming a part of the platen, a circular knife at the larger end of the body portion of the mandrel forming a part of the operative surface of the mandrel and having a sharpened edge at the outer side of the mandrel, and an arcuate knife having its inner edge sharpened to coact with the last mentioned mandrel knife.

6. In a device of the character described, the combination of an arcuate platen, an arcuate knife carried thereby at the outer edge, a V-groove being formed in the platen along the inner face of the knife, a conoidal mandrel adapted to have rolling coaction with the platen, and a knife carried by the conoidal mandrel and beveled toward the apex of its cone, such beveled edge of the knife being adapted to enter the V-groove in the platen.

7. In a device of the character described, the combination of a conoidal mandrel, an arcuate platen over which said mandrel is adapted to roll, said mandrel comprising two parts adapted to be brought together to clamp a disk between the same to form an end wall of the receptacle, circular knives carried respectively by the two parts of the mandrel, each knife being beveled on its inner edge, and coacting arcuate knives at the inner and outer edges of the platen positioned so that the mandrel knives coact with the inner edges of the arcuate knives.

8. In a device of the character described the combination of a conoidal mandrel, shearing instrumentalities at each end thereof, a platen with which said mandrel coacts and also provided with cutting instrumentalities co-acting with the cutting instrumentalities on the mandrel, the cutting edges on the platen facing toward the center of rotation and the cutting edges of the instrumentalities on the mandrel facing away from the center of rotation and means carried by the mandrel for forcing outwardly the material of the receptacle at its larger end as the blank is being severed.

In testimony whereof, I hereunto affix my signature.

DAVID J. JENNINGS.